3,705,142
SYNTHETIC THYROPROTEIN CONTAINING TRI-
IODOTHYRONINE PREPARED BY ADDITION OF
MULTIPLE CHARGES OF IODINE TO A PROTEIN
Charles W. Turner, 717 Hilltop Drive,
Columbia, Mo. 65201
No Drawing. Continuation-in-part of application Ser. No.
9,554, Feb. 9, 1970, which is a continuation-in-part of
abandoned application Ser. No. 764,938, Oct. 3, 1968.
This application Apr. 8, 1971, Ser. No. 132,559
Int. Cl. C07g 7/00, 15/00; A61k 17/10
U.S. Cl. 260—119          3 Claims

ABSTRACT OF THE DISCLOSURE

A synthetic thyroprotein containing triiodothyronine and a method of production comprising the addition of multiple charges of iodine to a proteinaceous material, interposed by oxygen sparging, to partially iodinate tyrosine in the protein to produce monoiodotyrosine and diiodotyrosine which, when oxidatively coupled, produce triiodothyronine.

--- metabolism and increasing the production of meat, wool and eggs in livestock and poultry; and (c) increasing the yield and percentage composition of the most valuable constituents of milk of lactating animals, particularly dairy cows.

A preferred method employed in producing thyroidally active L-thyroxine ($LT_4$) from thyroproteins is disclosed in Re. Patent No. 23,429, based upon earlier Patents Nos. 2,478,065; 2,379,842 and 2,329,445. The thyroprotein contemplated is composed of two essential ingredients, protein and iodine, from sources indicated in the patents and combined in the fashion described and explained in Re. 23,429.

In brief, iodine reacts with tyrosine in the protein molecule to form diiodotyrosine (DIT). The oxygenation or oxidative coupling of two molecules of DIT with the elimination of an alanine side chain (as suggested in Patent 2,435,947, col. 5, 11. 3–21) produces a thyroprotein containing biologically active L-thyroxine ($LT_4$). This reaction mechanism is exemplified by the following chemical formulas:

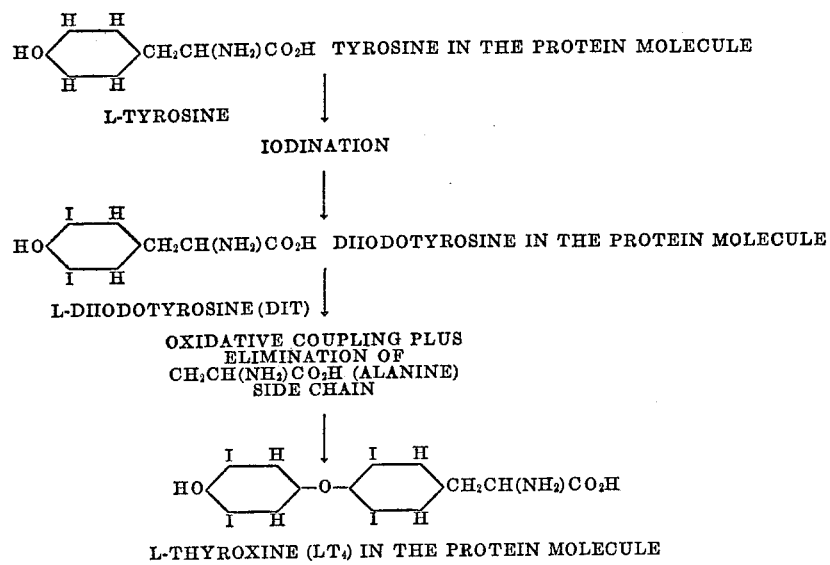

BACKGROUND OF THE INVENTION

This application is a continuation-in-part of my copending application Ser. No. 9,554 now abandoned, filed Feb. 9, 1970 which is a continuation-in-part of Ser. No. 764,938, filed Oct. 3, 1968, now abandoned.

The prior art discloses the advantages and utility in the feeding or inoculation of controlled amounts of thyroidally active thyroprotein which include:

(a) effecting the rate of secretion of the anterior pituitary gland of hormones which influence the metabolism of fats, carbohydrates and proteins;

(b) influencing the growth in immature animals and the metabolic and general well being of animals with low Process operating conditions for the production of $LT_4$ in the above manner are found in the prior art. Particularly illustrative of the process is Patent No. 2,642,426, by West et al., issued June 16, 1953, entitled "Method of Producing Thyroprotein," which employs casein as a beginning proteinaceous material because of its rich content of tyrosine. By such prior art methods, the thyroactive iodinated casein or thyroprotein is typically observed to contain about one percent (1%) of L-thyroxine ($LT_4$) which is the major hormone secreted by the thyroid gland.

For many years $LT_4$ was thought to be the only biologically active hormone of the thyroid gland. However, in 1952 Gross and Pitt-Rivers identified a second compound 3, 5, 3-triiodothyronine ($LT_3$) in human plasma (Sancet, i, 439) and Roche, Sissitsky and Michel (1952) reported on the presence of $LT_3$ in thyroglobuline (C. R. Acad. Sci. [Paris] 234, 1228). In 1953 it was isolated from cattle thyroid glands after pancreatic hydrolysis by Gross and Pitt-Rivers (Biochem J. 53, 645). A number of workers later showed $LT_3$ to be more biologically active than $LT_4$ by most methods of bioassay in various species.

In 1961, Premachandra, Pipes, and Turner were first to show that by subcutaneous injection $LT_3$ was more than twice as biologically active as $LT_4$ in cattle (Am. J. Physiol. 201, 77).

In 1965, Bauman and Turner showed the increased oral biological effectiveness of $LT_3$ in comparison with $LT_4$ and synthetic thyroprotein in cattle (J. Dairy Sci., 48, 1353). It was reported that thyroprotein given orally was as effective as $LT_4$ given orally. This indicated that only $LT_4$ was present in synthetic thyroprotein. The oral administration of $LT_3$ was found to be more than twice as effective as $LT_4$ or thyroprotein in cattle.

Similarly in fowls, Srevastova and Turner (1967) found that $LT_3$ was more than twice as effective as $LT_4$ by injection and by oral administration (Proc. Soc. Esper. Biol. & Med. 126, 157).

With such evidence indicating that $LT_3$ is at least twice as biologically active as the $LT_4$ hormone, it has become increasingly important to synthetically produce $LT_3$ since only one-half as much $LT_3$ is required as $LT_4$ for equal hormonal effect.

SUMMARY OF THE INVENTION

The primary object of this invention is to provide a synthetically derived thyroprotein containing triiodothyronine and a method of production thereof.

Basically, this invention involves the partial iodination of tyrosine in a proteinaceous material followed by oxygenation to produce a thyroprotein containing triiodothyronine.

DESCRIPTION OF THE INVENTION

A synthetic thyroprotein containing triiodothyronine is produced by first partially iodinating tyrosine in a proteinaceous material in order to form monoiodotyrosine (MIT) and diiodotyrosine (DIT). These two molecules are then oxidatively coupled to form $LT_3$ with the elimination of an alanine side chain. The reaction mechanism is exemplified by the following chemical formulas:

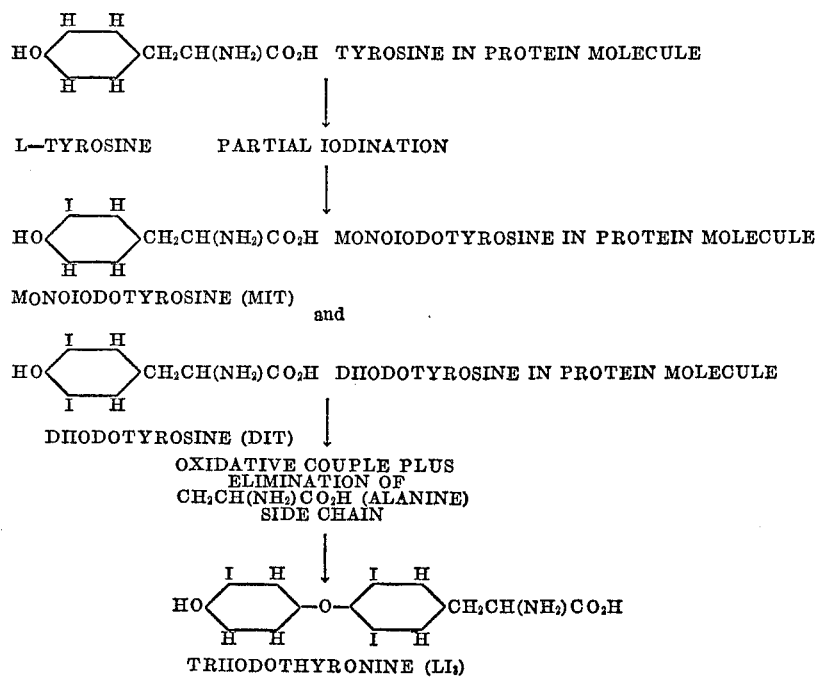

Many of the techniques for producing $LT_4$ may be adapted for producing $LT_3$ as taught herein. As previously mentioned, Pat. No. 2,642,426 by West et al. is a typical example of a method for $LT_4$ production. Such prior methods employ a single charge of iodine for complete iodination of the tyrosine in the protein, followed by oxygen sparging to produce $LT_4$. In my invention, however, partial iodination of the tyrosine is effected by multiple units or charges of iodine interposed with oxygenation. The total iodine cumulatively added by these multiple charges is equivalent to the total iodine requirement of the prior art methods of producing $LT_4$ by the addition of a single iodine charge. The total iodine requirement for complete iodination is equal to approximately 2.0 to 4.0 lbs. of iodine per lb. of tyrosine. A preferred range is 2.4 to 3.2 lbs. of iodine per lb. of tyrosine.

Therefore, once the total iodine requirement for the particular proteinaceous material is determined, this total amount is subdivided into a number of charges to carry out the process. After each charge is introduced to the reaction solution, oxygen sparging is effected for approximately 3 to 10 hours, and preferably between 3 and 6 hours. Although the number of charges may vary, I find that between 2 and 8 work satisfactorily, but prefer to work in the range of 3 to 5 charges. Likewise, the amount of each charge may vary and the charges need not be equal, but I find it is convenient to use charges which are approximately equal. Regardless of the number or amount of the charges, the cumulative amount of iodine employed during the process will equal the total iodine requirement just as if complete iodination was to be carried out.

This process may be practiced with any of the proteins listed in Table I. The weight percentage of tyrosine for each protein is given in order to determine the total iodine requirement based on the aforementioned ranges of 2.0 to 4.0 and 2.4 to 3.2 lbs. of iodine per lb. of tyrosine. This total amount may then be subdivided for use according to the above criteria.

TABLE I

| Protein: | Tyrosine content (wt. percent) |
|---|---|
| Casein | 6.4 |
| Linseed meal | 5.1 |
| Zein (corn protein) | 5.0 |
| Peanut flour | 4.4 |
| Egg albumin | 4.2 |
| Soybean meal | 4.1 |
| Wheat gluten | 3.8 |
| Cottonseed globulin | 3.1 |

When the above teachings are incorporated with those found in the art dealing with production of $LT_4$, the following procedure results in a synthetic thyroprotein containing $LT_3$.

A solution of a proteinaceous material chosen from Table I is first prepared and the temperature thereof raised to 150 to 175° F. A buffer salt such as sodium bicarbonate, is employed to maintain the pH of the solution on the alkaline side at a value of 8 to 9. A small quantity of potassium permanganate may be added to enhance subsequent oxygenation.

Next, the total iodine requirement for complete iodination is determined and then subdivided into a plurality of charges for partial iodination. The first charge is then added to the solution (usually taking about 15 min.) under vigorous agitation. Once the iodine is added, the temperature of the solution may be raised to 180–190° F. Dispersement of this charge of iodine through the solution effects partial iodination of the tyrosine to form MIT and DIT. Thereafter, oxygen sparging is carried out for 3 to 10 hours and the MIT and DIT are oxidatively coupled to produce $LT_3$ simultaneously with $LT_4$.

The second charge of iodine is then added to the solution, after which oxygen sparging produces additional $LT_3$ product. Likewise, third and subsequent charges of iodine are added, each followed by oxygen sparging, until all the charges have been used.

The solution is then cooled to a temperature of 130 to 160° F. and a concentrated acid is added to reduce the pH to the isoelectric point in order to precipitate the protein. When the protein curds have settled from the natant liquid, they are separated, dried, ground, and packaged.

The following examples are illustrative of my invention:

Example I

To a 700-gallon jacketed vessel was added water heated to 150° F. temperature. The vessel was equipped with two motor driven mechanical agitators capable of providing vigorous turbulence and an intimate mixture of the fluid contents of the vessel. In the bottom of the tank were injection pipes preferably perforated or having discharge nozzles spaced to distribute the gas injected throughout the contents of the vessel.

To the water was added seventy-five (75) pounds of sodium bicarbonate, three hundred (300) pounds of casein (containing approximately 19 pounds of tyrosine) and two (2) ounces of potassium permanganate with constant agitation to raise the pH of the mixture to 8 or 9.

Fifty (50) pounds of iodine crystals were divided into four (4) equal parcels, units or batches each weighing twelve and one-half (12½) pounds.

Heat was applied to the jacket of the vessel during the operation of the agitators to raise the temperature of the mixture to 183° F. At this time the iodine crystals contained in one of the twelve and one-half (12½) pound units were slowly added while continuously agitating to obtain an intimate dispersion of the iodine throughout the casein solution.

During these initial stages of the process the solution was continuously agitated to thoroughly distribute the solid constitutents of the vessel throughout the liquid.

After the iodine of the first unit was incorporated into the solution, which took approximately 15 to 30 minutes, oxygen was introduced through the gas injection pipes while continuing the mechanical agitation to thoroughly sparge the mixture for a period of approximately 6 hours.

At the end of the initial sparging period, after introduction of the first iodine unit, the injection of oxygen was discontinued and the iodine crystals of a second twelve and one-half (12½) pound charge or parcel were slowly added as before with continuous agitation and maintenance of the temperature of the solution as before. The incorporation of the iodine into the solution on each occasion took from 15 to 30 minutes.

After the introduction of the second iodine batch or unit the oxygen was again injected as before, while agitating the mixture, for somewhat over 6 hours.

The third and fourth batches or units of iodine were added and the solution sparged with oxygen in the same fashion as the first and second units.

After the final unit was run and sparged, the oxygen injection was discontinued and mechanical agitation stopped. The temperature was lowered to about 155° F. and hydrochloric acid (HCl) was added and the solution again agitated until its pH was reduced to 3.0 when the casein was precipitated from the liquid. Agitation was continued until the temperature reached 120° F. at which time agitation was again discontinued and the curd allowed to settle.

The natant liquor was decanted, the curd was removed and spun dry in a centrifuge then slowly heat dried for 6 hours after which it was ground and bagged for use.

From analysis of the resulting dried product, the synthetic thyroprotein or thyroactive iodinated casein contained both $LT_3$ and $LT_4$.

Example II

A synthetic thyroprotein containing triiodothyronine was prepared according to Example I except that 300 lbs. of linseed meal (containing about 15 lbs. of tyrosine) was used as a starting material in lieu of casein. The total iodine requirement for complete reaction of the linseed meal was approximately 40 lbs. This quantity was divided into four units of roughly 10 lbs. each for stepwise addition followed by oxygen sparging. The other reactants and conditions were the same as in Example I.

Example III

A synthetic thyroprotein containing triiodothyronine was prepared according to Example I except that 300 lbs. of soybean meal (containing about 12 lbs. of tyrosine) was used as a starting material in lieu of casein. The total iodine requirement for complete reaction of the soybean meal was approximately 33 lbs. This quantity was divided into three units of roughly 11 lbs. each for stepwise addition followed by oxygen sparging. The other reactants and conditions were the same as in Example I.

From the foregoing, it will be understood that this invention is one well adapted to attain all the ends and objects hereinabove set forth, together with other advantages which are obvious and which are inherent to the invention.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention, I claim:

1. A process for producing synthetic thyroprotein containing more than trace amounts triiodothyronine, said process comprising the steps of:

(a) preparing an alkaline solution, of a tyrosine containing proteinaceous material selected from the group consisting of casein, linseed meal, zein, peanut flour, egg albumin, soybean meal, wheat gluten, and cottonseed globulin;
(b) subdividing into a plurality of charges the total iodine requirement needed for complete iodination of the tyrosine in said proteinaceous material and based on a range of 2.0 to 4.0 lbs. of iodine per lb. of tyrosine;
(c) introducing said charges of iodine, one at a time, into the reaction solution whereby said tyrosine is partially iodinated to form monoiodotyrosine and diiodotyrosine; and
(d) interposing the addition of said charges of iodine with oxygen sparging of the reaction solution whereby the monoiodotyrosine and diiodotyrosine are oxidatively coupled to form triiodothyronine.

2. The process as in claim 1 wherein said proteinaceous material is casein.

3. The process as in claim 1 wherein said total iodine requirement is based on a range of 2.4 to 3.2 lbs. of iodine per lb. of tyrosine.

References Cited
UNITED STATES PATENTS

| | | | |
|---|---|---|---|
| Re. 23,429 | 11/1951 | Turner et al. | 260—112 |
| 2,130,985 | 9/1938 | Lautenschlager et al. | 260—519 |
| 2,642,426 | 6/1953 | West et al. | 260—112 |

OTHER REFERENCES

Advances in Protein Chemistry, vol. VI, 1951, pp. 253–263 and 272–281, Roche et al.

Chem-Abstracts, vol. 53, 1959, 190116–C, Lawendel et al.

HOWARD E. SCHAIN, Primary Examiner

U.S. Cl. X.R.

99—2 G, 2 H, 2 R; 260—112 T, 123, 123.5; 424—999